United States Patent Office 3,353,970
Patented Nov. 21, 1967

3,353,970
METAL SPATTER-FOULING INHIBITING
MATERIAL AND METHOD
Lester T. Bowers, Oreland, and John J. McDonnell, Roslyn, Pa., assignors to Scott Chemical and Welding Products Co., Inc., Oreland, Pa., a corporation of Pennsylvania
No Drawing. Filed Dec. 21, 1964, Ser. No. 420,115
6 Claims. (Cl. 106—2)

ABSTRACT OF THE DISCLOSURE

The present invention provides a method and a material comprising camphor for coating an item, in the areas lying close to a proposed welded union thereon, to enable these areas to be free of damage from spattering material resulting from the proposed welding operation.

This invention relates to metal spatter-fouling inhibiting material and method and has for an object the provision of improvements in this art.

There is a serious problem in metal welding operations, especially in the inert gas protected metallic arc welding operation, known as "Mig" (Metallic Inert Gas) welding, caused by the adherence to adjacent metal parts of flying molten metal particles or spatter. The adherence of such metal spatter to any adjacent metal surface, such as the workpiece or its holding fixtures, is objectionable; but the greatest objection is caused by the adherence of spatter metal to the welding tool itself, because the adherence here is concentrated and continuous during welding so that the efficiency of the welding tool is rapidly diminished.

As an example, in some welding operations the accumulation of spatter on a welding gun nozzle and tip is so rapid that effective operation cannot be maintained for more than fifteen or twenty minutes, after which the nozzle must either be cleaned—which is laborious and time-consuming, if possible at all—or replaced—which is expensive.

It is common in actual practice for workmen to strike the welding tool with a hammer or other heavy metal object or to strike the tool against some metal object in the attempt to remove the adherent spatter metal; but this distorts or breaks the tool and is discouraged as much as possible because the tools are quite expensive, even a small welding gun costing as much as $100 or more. Equally objectionable is the impairment of the efficiency of the equipment for making good welds.

Spatter adherence varies with the type of metal being welded, being greatest with galvanized metals but most weldable metals give considerable trouble. It also varies with the type of protective gas used, being greatest with carbon dioxide, the most commonly used protective gas. Moisture content of carbon dioxide is a particular source of trouble but this has been reduced by strict requirements for low moisture content for this gas when sold for welding use.

Spatter adherence is more troublesome when large electrodes are used, up to about 0.125″ max., but even so it is not always possible to use small diameter electrodes since the size which can be used is controlled by the type of work being done and material thickness.

Many suggestions have been made for reducing this trouble. One is found in Patent No. 2,929,911 of one of the present applicants, that being a method of operating the welding gun tip at such an angle relative to the surface of the workpiece that only a minimum amount of spatter can strike the welding tip and nozzle. That method was a great aid where it could be used for automatic welding but it is more convenient and less expensive to use semi-automatic welding guns in the more usual disposition and to inhibit the accumulation of adherent spatter metal in any and all positions of the welding tool.

Another suggestion was to cool the tool tip by a circulating coolant fluid but when a liquid coolant fluid is used the equipment is more complicated and there is always the likelihood of trouble with leaking liquid. For small or portable tools the use of liquid coolant is usually impracticable and undesirable. Gaseous coolant is slightly helpful; indeed the arc protecting gases commonly used, such as carbon dioxide, argon, helium, argon-oxygen, helium-oxygen, argon-helium, argon-carbon dioxide, and the like, are all helpful to some extent but even with cooling or cooling-protective fluids the adherent spatter accumulation is rapid and troublesome.

Another suggestion, already mentioned, was to use replaceable tube tips; but, as explained, this is quite expensive.

Another suggestion was to line or coat the tool, especially around the tip and nozzle, with a solid cladding, as chrome plating or a glass jacket, and these have given some improvement but hardly sufficient to justify the very considerable added expense.

Coatings of "Silicone" or "Silicone"-base materials have been tried at somewhat less expense and with relatively less success.

Another suggestion, and a fairly common practice, has been to coat the welding tip with industrial oils or greases but this requires frequent applications and, in addition to being only moderately effective, causes weld porosity and does not inhibit the formation of a fairly rapid and tenac accumulation of spatter material, apparently due to dust and dirt accumulation.

An object of the present invention, therefore, is to provide a metal coating material and method which will very greatly inhibit the adherence to the nozzle and tip portions of the welding tools or guns.

Another object is to provide a coating material and method which will aid in stabilizing the arc and reducing spatter from the arc, especially in concentric type welding tools in which the protective gas is caused to flow out around the electrode—as distinguished from "divorced" type guns which introduced the protective gas from a tubular nozzle located at one side of the electrode.

Another object is to provide a coating material and method which will give long periods of service without adherent spatter accumulation before another inhibitor or anti-fouling coating application is necessary and which reduces the adherent tenacity of the accumulation to the extent that it can readily be removed.

According to the present invention, based on many years of experience and extensive tests of a great number of materials, it has been found that camphor is very effective in inhibiting spatter tenacity and accumulation and in increasing arc stability with great reduction of splattering (Note: it has become usual in the art to refer to the action as "Spattering" and to the flying molten particles as "Spatter".)

Camphor, as available on the market, is a solid. It can be applied to metal surfaces by rubbing it on them or by melting it and applying it to the surfaces in that form. However, as a practical matter and for easy and convenient use, it is preferred to combine the camphor in a carrier base which when mixed will provide a product which is less solid and more liquid in nature, preferably in a relatively soft paste form which will permit easy spreading, as by brushing, or which will permit a tool tip to be pushed into the material—conveniently while the tool is warm or hot—to pick up a coating of the protective material.

A suitable carrier or base material, which does not have the objectionable characteristics of mineral oils and greases, is petrolatum, certain forms of which are sometimes referred to by the trade name of "Vaseline." This is available in various consistencies but for present purposes preferably has such consistency that it will melt at between 115 and 140 degrees F. The melting temperature can be lowered to room temperature by the addition of thinning additives of a suitable nature.

Since petrolatum vaporizes rapidly in arc welding zones it may be used in large proportions relative to the camphor. The camphor being the effective component of the mixture may vary between about 1% to about 99% by weight, a preferred commercially convenient range being 5% to 25% camphor to petrolatum by weight.

It has been found, further, that the wetting characteristics of the camphor-carrier mixture can be improved and its adhering durability and non-drying characteristics improved by adding a liquefying component, the one found to be most satisfactory up to the present time being turpentine. Only small amounts of this additive are needed. For example, 0.2 milliliter of turpentine for each pound of camphor-petrolatum mixture has given good results in keeping the coating moist and active and in preventing spatter adherency over much longer periods of time.

Up to the present time the reasons for the unusual effectiveness of camphor as a spatter inhibitor and as a spatter adherency inhibitor are not fully understood. Possibly there is a tenaciously adherent residue left on the metal surface after evaporation of other components. However, extensive tests have fully confirmed the fact that the camphor coating has a very remarkable effect in reducing spatter fouling of metal surfaces.

For example, with concentric welding nozzles—which most quickly foul under normal conditions—the use of camphor coating has extended the useful life by tens and hundreds of times the normal useful life. Under otherwise parallel conditions an uncoated nozzle would foul to the point where welding was unsatisfactory within twenty or thirty minutes and then be hard to clean; whereas a camphor coated nozzle would be useful up to four hours and often much more and then be very easy to clean. No other coating material which has been tried has in any way approached the unusual results obtained with camphor.

The mixture is made by melting the base material if it is not already in liquid form, dissolving the camphor in acetone or isopropyl alcohol or other types, mixing in a thinning agent if needed, and a wetting agent if needed, and thoroughly mixing all ingredients together.

Kerosene or gasoline can be used as bases when a liquid mixture is desired, or may be used with petrolatum as a thinning agent. For some purposes it is desirable to have a carrier base which can be ignited and burned off to leave the coating of camphor residue.

Other wetting agents may be organic oils, especially vegetable oils. Turpentine substitutes may be used but so far gum terpentine has given best results.

Either gum or synthetic camphor may be used but so far the natural or gum camphors have given best results. It is known that camphor is a terpenoid ketone ($C_{10}H_{16}O$) and that there are similar camphor-like gums and it is believed that a number of these would be satisfactory. The term "camphor" will be used herein to include such closely related substances.

In the above description the soft pasty form has been emphasized since it now appears that this is the form which will be most extensively used. Reference was made to the application of camphor by rubbing it on from a solid body of camphor. As a practical matter, it may be preferable to use a solid rubbing body which incorporates the camphor with a carrier base which makes it spread more easily and evenly and adhere more readily. A good carrier base for this purpose is a wax (beeswax and the like), stiffened or caked, if desired, by adding substances like cetyl alcohol, palmityl, or similar materials.

Petrolatum carrier bases can be stiffened by cetyl alcohol, palmityl, or similar materials. Spermaceti (from sperm whale head) can also be dissolved and stiffened.

It is thus seen that the invention provides an improved anti-fouling material and method of inhibiting metal fouling by adherent metal spatter particles.

While one embodiment of the invention has been described for purposes of illustration, it is to be understood that there may be various embodiments and modifications within the general scope of the invention.

What is claimed is:

1. The method of inhibiting splatter of metal in welding and inhibiting adherence of metal spatter to metal, which comprises, coating spatter-subject metal areas with a composition comprising about 1% to about 99% camphor by weight held in a carrier base.

2. The method of inhibiting splatter of metal in welding and inhibiting adherence of metal spatter to metal, which comprises, forming a combination of about 1% to about 99% camphor by weight with a carrier base, coating spatter-subject metal areas with said combination of camphor with a carrier base.

3. The method of inhibiting splatter of metal in welding and inhibiting adherence of metal spatter to metal, which comprises, coating spatter-subject metal areas with a combination of about 1% to about 99% camphor by weight in a carrier base and a liquefying substance in small amounts of about .2 milliliter per pound of said combination, said liquefying substance selected from turpentine, and petroleum derivatives.

4. The method of inhibiting splatter of metal in welding and inhibiting adherence of metal spatter to metal, which comprises, coating spatter-subject metal areas with a combination of 5% to 25% of camphor by weight mixed in a carrier base.

5. The method of inhibiting metal splatter from a welding and inhibiting adherence of metal spatter to the nozzle and tip portions of a gas-protected welding tool, which comprises, coating the nozzle and tip portions with a material comprising about 1% to about 99% of camphor by weight mixed in a carrier base.

6. The method of inhibiting splatter of metal in welding and inhibiting adherence of metal spatter to metal, which comprises, coating spatter-subject metal areas with camphor by rubbing said metal areas with a solid body of camphor.

References Cited

UNITED STATES PATENTS

| | | | |
|---|---|---|---|
| 608,612 | 8/1898 | Klever | 167—63 |
| 1,298,407 | 3/1919 | Sams | 167—63 |
| 1,344,338 | 6/1920 | Eisenhauer | 106—14 |
| 1,870,107 | 8/1932 | Fuller | 167—63 |
| 2,057,548 | 10/1936 | Wallach et al. | |
| 2,446,922 | 8/1948 | Grundner | 106—2 XR |

ALEXANDER H. BRODMERKEL, *Primary Examiner.*

L. B. HAYES, *Assistant Examiner.*